United States Patent
Pfaller et al.

(10) Patent No.: US 12,103,672 B2
(45) Date of Patent: Oct. 1, 2024

(54) ROTARY WING AIRCRAFT WITH A STABILIZER ARRANGEMENT

(71) Applicant: AIRBUS HELICOPTERS DEUTSCHLAND GMBH, Donauworth (DE)

(72) Inventors: Rupert Pfaller, Riemerling (DE); Tobias Ries, Nordendorf (DE)

(73) Assignee: AIRBUS HELICOPTERS DEUTSCHLAND GmbH, Donauworth (DE)

( * ) Notice: Subject to any disclaimer, the term of this patent is extended or adjusted under 35 U.S.C. 154(b) by 84 days.

(21) Appl. No.: 17/445,323

(22) Filed: Aug. 18, 2021

(65) Prior Publication Data
US 2022/0185467 A1    Jun. 16, 2022

(30) Foreign Application Priority Data
Dec. 14, 2020   (EP) .................................... 20400026

(51) Int. Cl.
*B64C 27/82*   (2006.01)
*B64C 27/06*   (2006.01)
*B64C 39/00*   (2023.01)

(52) U.S. Cl.
CPC ............. *B64C 27/82* (2013.01); *B64C 27/06* (2013.01); *B64C 39/029* (2020.01); *B64C 2027/8263* (2013.01)

(58) Field of Classification Search
CPC ............ B64C 27/82; B64C 2027/8263; B64C 39/029; B64C 39/12
See application file for complete search history.

(56) References Cited

U.S. PATENT DOCUMENTS

| | | | |
|---|---|---|---|
| 2,452,355 A | 10/1948 | Nall | |
| 5,209,430 A | 5/1993 | Wilson et al. | |
| 5,454,530 A | 10/1995 | Rutherford et al. | |
| 6,416,015 B1* | 7/2002 | Carson | B64C 27/82 244/17.19 |
| 6,435,453 B1* | 8/2002 | Carter, Jr. | B64C 27/02 244/17.11 |

(Continued)

FOREIGN PATENT DOCUMENTS

| | | |
|---|---|---|
| DE | 20303024 U1 | 8/2003 |
| EP | 2687442 A1 | 1/2014 |

(Continued)

OTHER PUBLICATIONS

European Search Report for European Application No. EP 20400026. 9, Completed by the European Patent Office, Dated May 18, 2021, 9 pages.

*Primary Examiner* — Joshua J Michener
*Assistant Examiner* — Cindi M Curry
(74) *Attorney, Agent, or Firm* — Brooks Kushman P.C.

(57) ABSTRACT

A rotary wing aircraft that extends along an associated roll axis between a nose region and an aft region and that comprises a fuselage with a front section and a rear section, the rotary wing aircraft comprising: a main rotor that is rotatably mounted at the front section, and a stabilizer arrangement that is arranged at the rear section in the aft region, wherein the rear section extends between the front section and the stabilizer arrangement and comprises an asymmetrical cross-sectional profile in direction of the associated roll axis.

20 Claims, 7 Drawing Sheets

(56) References Cited

U.S. PATENT DOCUMENTS

| | | | |
|---|---|---|---|
| 6,755,374 B1 | 6/2004 | Carson | |
| 7,448,571 B1* | 11/2008 | Carter, Jr. | B64C 27/024 |
| | | | 244/6 |
| 8,807,476 B2* | 8/2014 | Raffel | B64C 39/029 |
| | | | 244/17.11 |
| 8,991,745 B1* | 3/2015 | Khan | B64C 27/52 |
| | | | 244/17.11 |
| 9,132,915 B2* | 9/2015 | Zhu | B64C 29/0025 |
| 11,001,378 B2* | 5/2021 | Evulet | B64C 3/16 |
| 11,338,927 B2* | 5/2022 | Abramian | B64C 39/12 |
| 11,655,021 B2* | 5/2023 | Pfaller | B64C 1/0009 |
| | | | 244/17.19 |
| 2010/0084509 A1* | 4/2010 | Weaver | B64C 25/16 |
| | | | 244/102 R |
| 2011/0272519 A1* | 11/2011 | Challis | B64C 27/26 |
| | | | 244/6 |
| 2013/0175386 A1* | 7/2013 | Raffel | B64C 39/029 |
| | | | 244/17.11 |
| 2016/0046369 A1* | 2/2016 | Watkins | B64C 27/24 |
| | | | 244/7 A |
| 2017/0113793 A1* | 4/2017 | Toulmay | B64C 27/22 |
| 2021/0047028 A1* | 2/2021 | Choi | B64C 27/82 |
| 2021/0284329 A1* | 9/2021 | Bernard | B64C 29/0033 |
| 2021/0371091 A1* | 12/2021 | Kobayashi | B64C 27/57 |

FOREIGN PATENT DOCUMENTS

| | | |
|---|---|---|
| EP | 2878536 A1 | 6/2015 |
| EP | 3317180 A2 | 5/2018 |
| FR | 2897040 A1 | 8/2007 |
| GB | 670455 A | 7/1945 |
| JP | H0471997 A * | 3/1992 |
| JP | H07132893 A | 5/1995 |
| RU | 2282565 C2 | 8/2006 |
| WO | 2014089604 A1 | 6/2014 |
| WO | 2014176431 A1 | 10/2014 |
| WO | 2017027112 A2 | 2/2017 |

* cited by examiner

ROTARY WING AIRCRAFT WITH A STABILIZER ARRANGEMENT

CROSS-REFERENCE TO RELATED APPLICATIONS

This application claims priority to European patent application No. EP 20400026.9 filed on Dec. 14, 2020, the disclosure of which is incorporated in its entirety by reference herein.

TECHNICAL FIELD

The present disclosure relates to a rotary wing aircraft that extends along an associated roll axis between a nose region and an aft region and that comprises a fuselage with a front section and a rear section, wherein the rotary wing aircraft further comprises a main rotor that is rotatably mounted at the front section and a stabilizer arrangement that is arranged in the aft region.

BACKGROUND

In operation, the main rotor of such a rotary wing aircraft creates torque around the yaw axis that is inherent to the rotary wing aircraft. This torque must be counteracted by a suitable anti-torque device to guarantee a required yaw stability of the rotary wing aircraft in flight operation.

Various anti-torque devices are known from rotary wing aircrafts in the form of conventional helicopters, wherein a respective main rotor creates torque around the helicopter's yaw axis. Usually, such conventional helicopters have a tail rotor which is provided as anti-torque device to provide anti-torque that counteracts the torque created by the helicopter's main rotor.

Moreover, as main rotor downwash of such a conventional helicopter generally flows around its tail boom, the tail boom may be provided with additional anti-torque devices in the form of strakes or vortex generators to alter the flow of downwash in order to generate a compensation force that counteracts at least partially the torque created by the main rotor such that a respective down-sizing of the tail rotor is enabled. Furthermore, a fairing may be added as additional anti-torque device to the tail boom of such a conventional helicopter to create the compensation force, or the profile of the tail boom as such may be modified. Other additional anti-torque devices may likewise be added to the tail boom, such as e.g., a rotating cylinder that uses the so-called Magnus effect to generate the compensation force.

Illustrative conventional helicopters with main rotors, tail rotors and such additional anti-torque devices are described in the documents EP 3 317 180 A2, WO 2014/176431 A1, and U.S. Pat. No. 5,209,430 A.

If a respectively created compensation force suffices to counteract biasing torque created by the main rotor, it is also possible to omit provision of the tail rotor. Illustrative helicopters with a main rotor and an anti-torque device that enables omission of a respective tail rotor are described in the documents FR 2 897 040 A1, RU 2 282 565 C2, and U.S. Pat. No. 2,452,355 A.

The above-described anti-torque devices, however, either require presence of a tail rotor or they are bulky and/or require actuatable components, such as additional fans, rotatable truncated cones or rotatable cylinders. Nevertheless, both the tail rotor and such actuatable components increase an overall system complexity and an overall weight of the anti-torque devices of such helicopters.

SUMMARY

It is, therefore, an object of the present disclosure to provide a new helicopter and, more generally, a new rotary wing aircraft with a main rotor and an improved anti-torque device that exhibits a comparatively low overall system complexity and a reduced overall weight.

This object is solved by a rotary wing aircraft that comprises the features of claim 1. More specifically, according to the present disclosure a rotary wing aircraft is provided that extends along an associated roll axis between a nose region and an aft region and that comprises a fuselage with a front section and a rear section. The rotary wing aircraft comprises a main rotor that is rotatably mounted at the front section, and a stabilizer arrangement that is arranged at the rear section in the aft region. The rear section extends between the front section and the stabilizer arrangement and comprises an asymmetrical cross-sectional profile in direction of the associated roll axis.

Preferably, the rear section of the fuselage is configured to generate sideward thrust for main rotor anti-torque from main rotor downwash. Likewise, the stabilizer arrangement is preferably also configured to generate sideward thrust for main rotor anti-torque from main rotor downwash.

Thus, a passive anti-torque device that comprises at least the rear section of the fuselage and the stabilizer arrangement may be provided, which is at least approximately self-balancing. This passive anti-torque device does not require any complex actuating mechanisms, thereby avoiding the weight and the need for redundancy of an active system. Accordingly, a reduced overall system complexity of the inventive passive anti-torque device may be obtained and, consequently, a required maintenance effort for the anti-torque device will be comparatively low.

Furthermore, as no conventional tail rotor is required for generating anti-torque, less power is needed in hover condition, in which a conventional tail rotor usually consumes up to 13% of the overall consumed power. Thus, less fuel is needed and a gain of lifting capacity may be obtained.

In an illustrative realization, in order to further increase generation of sideward thrust for main rotor anti-torque from main rotor downwash, the rear section of the fuselage of the rotary wing aircraft may exhibit a shape that is similar to a profile of a so-called high lift airfoil. Thus, comparatively high sideward thrust may already be generated at comparatively low downwash air speed.

Preferably, at least the main part of the rear section of the fuselage is asymmetrically located to a side of the rotary wing aircraft that is farther away from an approaching rotor blade of the main rotor in the sense of rotation of the main rotor. In other words, if the main rotor rotates in counter-clockwise direction, the main part of the rear section of the fuselage is located at the starboard side of the rotary wing aircraft, i.e., the right-hand side of the fuselage of the rotary wing aircraft.

Advantageously, a vertical cut through the rear section of the fuselage at a position that is close to the aft region of the rotary wing aircraft resembles to a high lift airfoil. This high lift airfoil is orientated at that position preferably at least approximately in vertical direction providing "lift", i.e., sideward thrust in the same direction in which the main rotor is rotating. In other words, if the main rotor rotates in counterclockwise direction, the sideward thrust likewise points into this direction.

Thus, less power is needed in hover condition as generation of downward drag in response to main rotor downwash is reduced due to a transformation of the main rotor downwash into sideward thrust, compared to the downward drag that is e.g., created by a tail boom of a conventional helicopter in response to main rotor downwash. Consequently, a gain of lifting capacity and fuel savings may be realized compared to a conventional helicopter.

Advantageously, a transition in the region of the main rotor of the rotary wing aircraft, preferably in a region between a respective main rotor axis and the rear section of the fuselage, from a cross-sectional profile of the front section of the fuselage to the high lift airfoil-shaped cross-sectional profile of the rear section of the fuselage, may be embodied as a smooth recess. The latter is preferably shaped in order to avoid airflow separation.

The front section may be provided with at least one tiltable wing that is preferably arranged in front of the respective main rotor axis. By way of example, the at least one tiltable wing may be a so-called canard-type wing.

Preferably, tilting of the at least one tiltable wing may be adjusted via pilot input by means of an associated lever. Alternatively, tilting may be controlled automatically by a mechanic and/or electronic device based on the measured airflow close to the area of the at least one tiltable wing and mainly depending on the true airspeed at this area and matched and controlled with other flight data.

In an illustrative realization, if the rotary wing aircraft is equipped with a retractable landing gear, tilting is controlled by the same device as used to control retraction/deployment of the retractable landing gear. Thus, the at least one tiltable wing may be tilted in response to a respective deployment/retraction command issued to the retractable landing gear or, alternatively, in two steps where the first or second step may be an adjustment of the at least one tiltable wing to its vertical end position before or after the retractable landing gear is deployed. Vice versa the command for the at least one tiltable wing will be inverted when the retractable landing gear will be retracted. Thus, simultaneously or before or after the retractable landing gear is retracted the wing will be rotated forward into its forward flight condition in order to produce lift.

Preferably, the at least one tiltable wing comprises two separately controllable wings, one on each side of the rotary wing aircraft. However, a solution with a tiltable wing only on the starboard side or right-hand side—for the main rotor rotating in counterclockwise direction—is likewise possible.

Both wings should preferably be configured to be tiltable to an angle close to vertical in order to enable reduction of drag for the main rotor downwash in hover condition. Thus, both wings may advantageously be used as airbrakes in forward flight. Furthermore, each one of the tiltable wings may be provided with winglets or endplates, or be formed as a boxwing.

However, the angle up to which both wings are tiltable is in any case preferably suitable to enable generation of sideward thrust to counteract main rotor torque. Accordingly, for equal wing profiles on both sides of the rotary wing aircraft a respective tilting angle must be controllable and adjustable independent of the other such that a respectively required sideward thrust may be generated.

Alternatively, both wings may have different profiles, wing span, depth and surface area. In fact, for a counter-clockwise rotating main rotor the port side or left-hand side tiltable wing must develop more lift in fast forward flight because the airflow on a rearward rotating main rotor blade has a lower airflow speed than the airflow at a forward rotating main rotor blade. Therefore, above a certain forward speed it is difficult or impossible to increase the angle of attack of the rearward rotating main rotor blade to compensate the reduced airspeed. Accordingly, in order to compensate this effect more lift may be produced with the tiltable wing on the portside or left-hand side. This can be achieved by airfoils with higher possible maximum lift, higher angles of attack, more wing span, higher depth, surface area or cascading profiles as described hereinafter for the rear section of the fuselage.

Preferably, the rear section is provided in the aft region with the stabilizer arrangement. An underlying transition of the rear section of the fuselage to the stabilizer arrangement is preferentially smooth. In other words, the stabilizer arrangement has preferably at a respective connection area to the rear section a slightly curved shape that corresponds to the shape of the envelope of the rear section at the underlying transition.

The stabilizer arrangement may comprise two lateral vertical stabilizers which are interconnected by means of an associated horizontal stabilizer. Respective profile angles of attachment of the vertical stabilizers are preferably inclined to generate sideward thrust to compensate the main rotor torque in forward flight.

Each vertical stabilizer may have a rudder or a rotatable profile section to control the sideward thrust in forward flight. A respective control action may be linked to the pedal deflection, similar to airplanes.

Both vertical stabilizers preferably extend upwards approximately at least up to the rotor plane of the main rotor, or even above. At respectively formed upper ends of both vertical stabilizers the horizontal stabilizer is located.

The position of the horizontal stabilizer is preferably similar in height as for horizontal stabilizers of so-called T-tails of conventional helicopters. However, in contrast to such T-tails, the horizontal stabilizer of the inventive stabilizer arrangement is fixed at both lateral ends to the vertical stabilizers and, thus, comparatively stiffer.

For an improved behavior against excitation from main rotor wake, the horizontal stabilizer may have an inclined, swept back and/or a curved plan view where the horizontal stabilizer can be tapered at one or both ends. Both vertical stabilizers act additionally as endplates for the horizontal stabilizer, which increases the effectivity of the horizontal stabilizer. Vice versa the horizontal stabilizer acts preferably in similar way for both vertical stabilizers as an endplate with the same effect.

Furthermore, at least one wing-type aerodynamic device, which is also referred to as the "support wing" hereinafter, may be associated with the rear section of the fuselage for additional generation of sideward thrust for main rotor anti-torque from main rotor downwash. Advantageously, the support wing and the rear section of the fuselage, i.e., the airfoil-shaped aerodynamic device, support the stabilizer arrangement on both sides of the rotary wing aircraft, as there is no center part of the rear section of the fuselage, compared to a tail boom of a conventional helicopter.

In operation of the rotary wing aircraft, a certain amount of main rotor downwash is present mainly in hover condition. Therefore, "lift" in horizontal direction, i.e., sideward thrust, may advantageously be generated from the main rotor downwash simultaneously by the rear section of the fuselage, the associated support wing, as well as the stabilizer arrangement, in order to counteract the torque created by the main rotor in the hover condition.

Preferably, the support wing is mainly oriented vertically. More specifically, the support wing may e.g., connect an upper deck of the rotary wing aircraft to the stabilizer arrangement, e.g., from slightly behind of the main rotor to the stabilizer arrangement. An underlying transition of the support wing to the stabilizer arrangement is preferably smooth. In other words, the stabilizer arrangement has preferably at a respective connection area to the support wing a slightly curved shape that corresponds to the shape of the envelope of the support wing at the underlying transition.

Advantageously, the support wing also exhibits a shape that is similar to a profile of a high lift airfoil. Preferably, the support wing has its greatest width at an area located between 60% of the length of the main rotor's rotor blades and an outer end of the rotor blades.

According to one aspect, the rotary wing aircraft further comprises at least one lateral wing-type aerodynamic device that is arranged at the front section.

According to one aspect, the at least one lateral wing-type aerodynamic device comprises at least one wing element that is pivotable relative to the fuselage to generate sideward thrust for main rotor anti-torque from main rotor downwash.

According to one aspect, the at least one wing element comprises at least a first wing element and a second wing element, wherein the first and second wing elements are individually pivotable to different pivoting angles.

According to one aspect, the first wing element comprises a first airfoil profile and the second wing element comprises a second airfoil profile, wherein the first airfoil profile differs from the second airfoil profile.

According to one aspect, at least one of the first wing element and the second wing element is formed as a boxwing.

According to one aspect, the at least one wing element is a canard-type wing.

According to one aspect, the rotary wing aircraft further comprises a retractable landing gear that is operatively coupled to the at least one wing element such that actuation of the retractable landing gear leads to actuation of the at least one wing element.

According to one aspect, the stabilizer arrangement comprises at least one horizontal stabilizer and at least one first and one second vertical stabilizer, wherein the at least one horizontal stabilizer connects the first vertical stabilizer to the second vertical stabilizer.

According to one aspect, the stabilizer arrangement comprises a boxwing-type connection that connects the first vertical stabilizer to the second vertical stabilizer such that the stabilizer arrangement forms a boxwing-type configuration.

According to one aspect, the at least one first vertical stabilizer is attached to the rear section.

According to one aspect, the rear section comprises at least one airfoil-shaped aerodynamic device that extends from the front section to the stabilizer arrangement, wherein the at least one airfoil-shaped aerodynamic device is configured to generate sideward thrust for main rotor anti-torque from main rotor downwash.

According to one aspect, the rotary wing aircraft further comprises at least one longitudinal wing-type aerodynamic device that extends between the front section and the stabilizer arrangement, wherein the at least one longitudinal wing-type aerodynamic device is configured to generate sideward thrust for main rotor anti-torque from main rotor downwash.

According to one aspect, the at least one longitudinal wing-type aerodynamic device is attached to the at least one second vertical stabilizer.

According to one aspect, the rotary wing aircraft is embodied as a helicopter, wherein the front section of the fuselage forms a cabin for passengers and/or cargo, and wherein the main rotor forms a single rotor plane.

Thus, an improved helicopter with a reduced total number of constituting components and a reduced overall system complexity may be provided.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
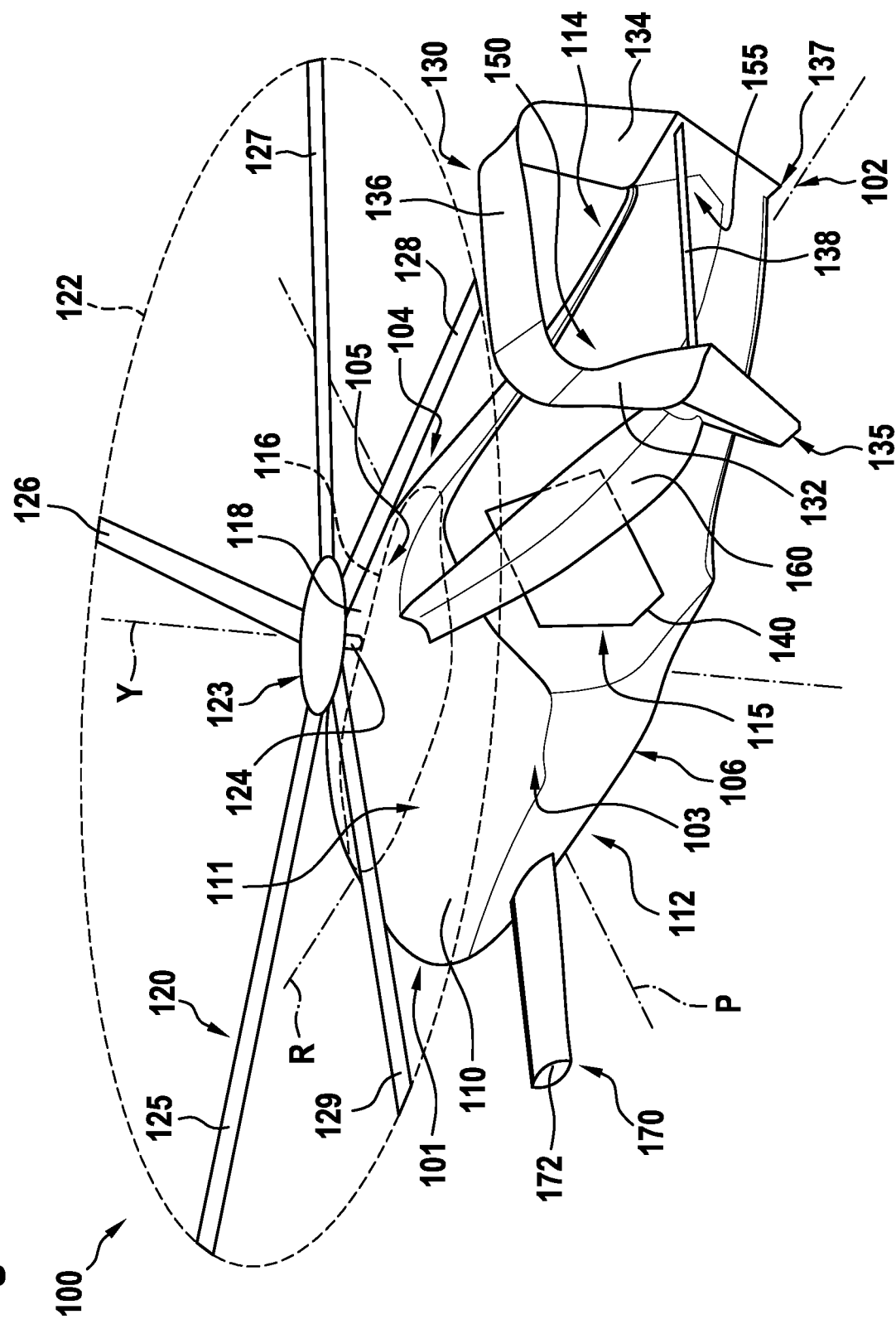
FIG. 1 shows a perspective view of a rotary wing aircraft with a fuselage according to the present disclosure.

FIG. 1 shows an illustrative rotary wing aircraft 100 with a fuselage 110 and a main rotor 120. By way of example, the rotary wing aircraft 100 is shown with three mutually orthogonal axes P, R, and Y. The axis P represents a transversal axis that corresponds to the pitch axis inherent to the rotary wing aircraft 100, the axis R represents a longitudinal axis that corresponds to the roll axis inherent to the rotary wing aircraft 100, and the axis Y represents a vertical axis that corresponds to the yaw axis inherent to the rotary wing aircraft 100.

By way of example, the rotary wing aircraft 100 is illustrated in forward flight. Thus, only components that are required for forward flight and that are related to the present disclosure are illustrated in more detail, while illustration of other components is omitted, for simplicity and clarity of the drawing. For instance, neither the fuselage 110 is illustrated in greater detail for showing e.g., respective doors and windows, nor a possible landing gear, which may be a wheel-tape landing gear or a skid-type landing gear mounted to the fuselage 110, is shown, and so on.

Illustratively, the fuselage 110 extends along the roll axis R from a nose region 101 to an aft region 102 of the rotary wing aircraft 100. The fuselage 110 comprises a front section 112 and a rear section 114. Illustratively, the front section 112 comprises a port side wall 103 and a starboard side wall 104.

Preferably, the rear section 114 is configured to generate sideward thrust for main rotor anti-torque from main rotor downwash and extends in prolongation to one of the port side wall 103 or the starboard side wall 104. Illustratively, the rear section 114 extends between the front section 112 and a stabilizer arrangement 130 and comprises an asymmetrical cross-sectional profile in direction of the roll axis R.

More specifically, the rear section 114 preferably extends in prolongation to a side of the fuselage 110 that is farther away from an approaching rotor blade of the main rotor 120 in the sense of rotation of the main rotor 120. Assuming that the main rotor 120 rotates in counterclockwise direction, the rear section 114 of the fuselage 110 would be located at the starboard side of the rotary wing aircraft 100 and, thus, be arranged in prolongation to the starboard side wall 104 as illustrated.

By way of example, the front section 112 merges into the rear section 114 at an associated transition or recess area 115. In other words, starting at the nose region 101 of the fuselage 110 and travelling along the roll axis R, the fuselage 110 has the front section 112 that merges at the transition or recess area 115 into the rear section 114 that, in turn, terminates in the aft region 102. The front section 112 preferably forms a cabin 111 for passengers and/or cargo.

According to one aspect, a rear door 140 and/or additional equipment, such as e.g., a winch, may be arranged in the recess area 115. The rear door 140 may e.g., be a sliding or dual cantilever door.

By way of example, the rear door 140 may be slidable into the fuselage 110, i.e., toward the cabin 111. Thus, in forward flight with opened door, there is no additional drag generated by the rear door 140.

Preferably, the rear door 140 is accessible from a rear side of the helicopter 100, i.e., coming from the rear section 114. Thus, the cabin 111 may be loaded from the rear side. Advantageously, by positioning the rear door 140 in the recess area 115, penalties to the overall aerodynamic performance of the helicopter 100 due to the rear door 140 may be avoided.

The cabin 111 and, more generally, the fuselage 110 illustratively extends in direction of the yaw axis Y from a lower side 106 to an upper limit 116 that separates the cabin 111 from an upper deck 105. The upper deck 105 is preferably covered by a cowling 118.

By way of example, the cowling 118 may cover one or more suitable engines and a main gear box that rotates the main rotor 120 in operation. Accordingly, the main rotor 120 is rotatably mounted at the front section 112 of the fuselage 110.

Preferably, the main rotor 120 forms a single rotor plane 122 and is adapted to provide lift and forward or backward thrust during operation. Illustratively, the main rotor 120 is embodied as a multi-blade main rotor with a plurality of rotor blades 125, 126, 127, 128, 129 which are coupled at an associated rotor head 123 to a rotor mast 124, which rotates in operation of the rotary wing aircraft 100 around an associated rotor axis.

According to one aspect, the rotary wing aircraft 100 is embodied as a helicopter and, therefore, referred to hereinafter as the "helicopter 100", for simplicity and clarity. The helicopter 100 and, more particularly, the main rotor 120 of the helicopter 100 creates torque around the yaw axis Y in operation. This torque must be counteracted to guarantee a required yaw stability of the helicopter 100 in flight operation. Therefore, the rear section 114 of the helicopter 100 and the stabilizer arrangement 130 are preferably configured to generate sideward thrust for main rotor anti-torque from main rotor downwash of the main rotor 120.

Illustratively, the rear section 114 comprises at least one airfoil-shaped aerodynamic device 150 that extends preferably from the front section 112 to the aft region 102 and, more particularly, to the stabilizer arrangement 130. Preferably, a smooth transition 155 is formed from the at least one airfoil-shaped aerodynamic device 150 to the stabilizer arrangement 130. By way of example, only one airfoil-shaped aerodynamic device 150 is shown. This airfoil-shaped aerodynamic device 150 is illustratively arranged in prolongation to the starboard side wall 104.

In an illustrative realization, the airfoil-shaped aerodynamic device 150 is formed as, or by, a wing. This wing is, however, not arranged transversally to the roll axis R, but instead at least approximately in parallel to the roll axis R.

The airfoil-shaped aerodynamic device 150 may form the rear section 114, at least partly. According to one aspect, the airfoil-shaped aerodynamic device 150 is configured to generate sideward thrust for main rotor anti-torque from main rotor downwash.

In addition, the rear section 114 preferably further comprises at least one wing-type aerodynamic device 160 that extends between the front section 112 and the stabilizer arrangement 130. By way of example, only one wing-type aerodynamic device 160 is shown.

Illustratively, the wing-type aerodynamic device 160 is at least approximately arranged in prolongation to the port side wall 103. According to one aspect, the wing-type aerodynamic device 160 is also configured to generate sideward thrust for main rotor anti-torque from main rotor downwash of the helicopter 100.

Preferably, the wing-type aerodynamic device 160 is mounted to the stabilizer arrangement 130 and to the upper deck 105 of the helicopter 100. Illustratively, the wing-type aerodynamic device 160 and the airfoil-shaped aerodynamic device 150 are connected to opposite sides of the stabilizer arrangement 130.

The stabilizer arrangement 130 is preferably arranged at the rear section 114 in the aft region 102 of the fuselage 110. According to one aspect, the stabilizer arrangement 130 comprises at least one first and one second vertical stabilizer, as well as at least one horizontal stabilizer. The at least one horizontal stabilizer preferably connects the at least one first stabilizer to the at least one second stabilizer.

By way of example, the stabilizer arrangement 130 comprises two vertical stabilizers 132, 134, as well as one horizontal stabilizer 136 that connects the two vertical stabilizers 132, 134 to each other. Illustratively, the vertical stabilizer 134 is attached to the rear section 114 at the smooth transition 155. Similarly, the vertical stabilizer 132 is attached to the wing-type aerodynamic device 160.

More specifically, both vertical stabilizers 132, 134 preferably extend upward, i.e., in direction of the yaw axis Y, at least approximately up to the rotor plane 122 of the main rotor 120, or even above. At respectively formed upper ends of both vertical stabilizers 132, 134 the horizontal stabilizer 136 is located. Thus, the stabilizer arrangement 130 as a whole is at least approximately U-shaped.

Preferably, the position of the horizontal stabilizer 136 is at least approximately similar in height as a respective height of a horizontal stabilizer of a so-called T-tail arranged on a tail boom of a conventional helicopter. However, in contrast to such a T-tail, the horizontal stabilizer 136 is not only fixed at a central position, but instead at both lateral ends to the vertical stabilizers 132, 134, and, thus, comparatively stiffer.

Moreover, for an improved behavior against excitation from main rotor wake, the horizontal stabilizer 136 may have an inclined, swept back and/or a curved plan view where the horizontal stabilizer 136 may be tapered at one or both ends. Both vertical stabilizers 132, 134 preferably act additionally as endplates for the horizontal stabilizer 136, thus, increasing the efficiency of the horizontal stabilizer 136. Vice versa, the horizontal stabilizer 136 acts in similar way for both vertical stabilizers 132, 134 as an endplate with the same effect.

Furthermore, the vertical stabilizer 132 may be attached to the vertical stabilizer 134 via a horizontal strut 138 to increase an underlying stiffness of the stabilizer arrangement 130. The horizontal strut 138 is illustratively arranged close to respective end tips 135, 137 of the vertical stabilizers 132, 134.

According to one aspect, the helicopter 100 further comprises at least one lateral wing-type aerodynamic device 170. Preferably, the at least one lateral wing-type aerodynamic device 170 is arranged at the front section 112 of the fuselage 110, preferentially in front of the yaw axis Y.

More specifically, the at least one lateral wing-type aerodynamic device 170 preferably comprises at least one wing element 172 that is tiltable, i.e., pivotable relative to the fuselage 110 to generate sideward thrust for main rotor anti-torque from main rotor downwash. The at least one wing element 172 is illustratively a canard-type wing. Alternatively, the at least one wing element 172 may be formed as a boxwing.

Figure 2:
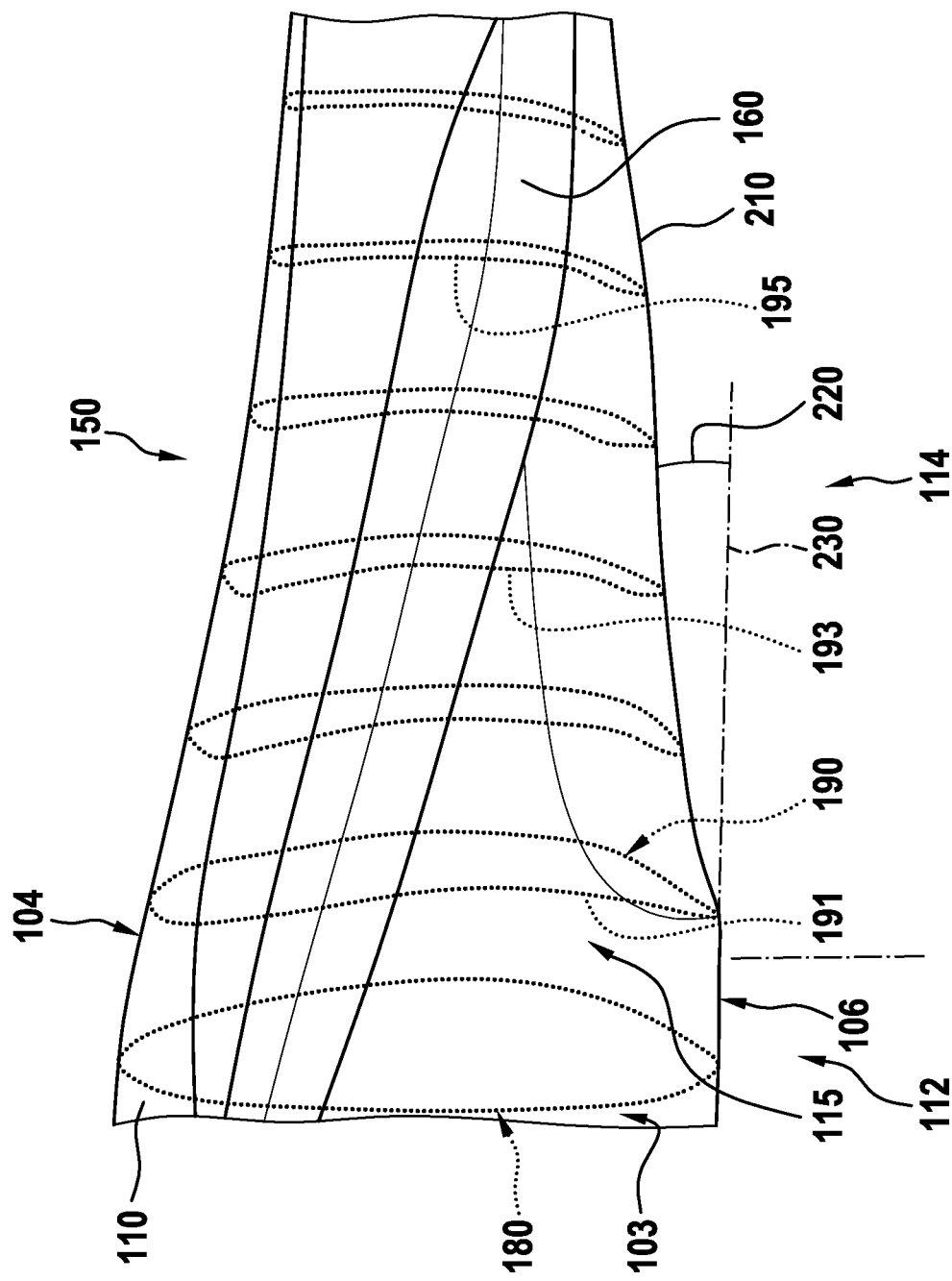
FIG. 2 shows a cut-out of the rotary wing aircraft of FIG. 1.

FIG. 2 shows a portion of the helicopter 100 of FIG. 1 with the fuselage 110 that comprises the front section 112, the recess area 115, and the rear section 114. According to FIG. 1, the rear section 114 is provided with the airfoil-shaped aerodynamic device 150 and the wing-type aerodynamic device 160.

Preferably, the rear section 114 comprises an asymmetrical cross-sectional profile 190 in direction of the roll axis R of the helicopter 100 of FIG. 1. According to one aspect, the asymmetrical cross-sectional profile 190 is at least approximately C-shaped, as illustrated by way of example with a series of cross-sectional profiles 191, 193, 195. In contrast to the rear section 114, the front section 112 of the fuselage 110 may at least partly exhibit a symmetrical cross-sectional profile, as e.g., illustrated by means of a symmetrical cross-sectional profile 180.

More specifically, the cross-sectional profile 180 has illustratively at least approximately an oval shape, which is by way of example slightly egg-shaped. This oval shape merges at the recess area 115 into an airfoil shape, which is at least approximately C-shaped, as illustrated by the cross-sectional profiles 191, 193, 195.

Furthermore, for purposes of illustration a bottom line 210 of the rear section 114 of the fuselage 110 is shown. This bottom line 210 is preferably angled by a predetermined inclination angle 220 relative to a horizontal reference plane 230. By way of example, the predetermined inclination angle 220 is a positive (dihedral) angle that may be selected dependent on a required sideward thrust that is to be generated by the rear section 114 of the fuselage 110 in operation.

It should, nevertheless, be noted that the dihedral angle is only shown and described by way of example and not for restricting the rear section 114 accordingly. Moreover, it should be noted that instead of selecting the illustrative dihedral angle e.g., a negative (anhedral) angle may likewise be selected for the predetermined inclination angle 220. In this case, an increase of up to 30% of generated sideward thrust may be obtained, resulting in a possibly achievable increase of more than 40% of a respectively generated counteracting moment.

Figure 3:
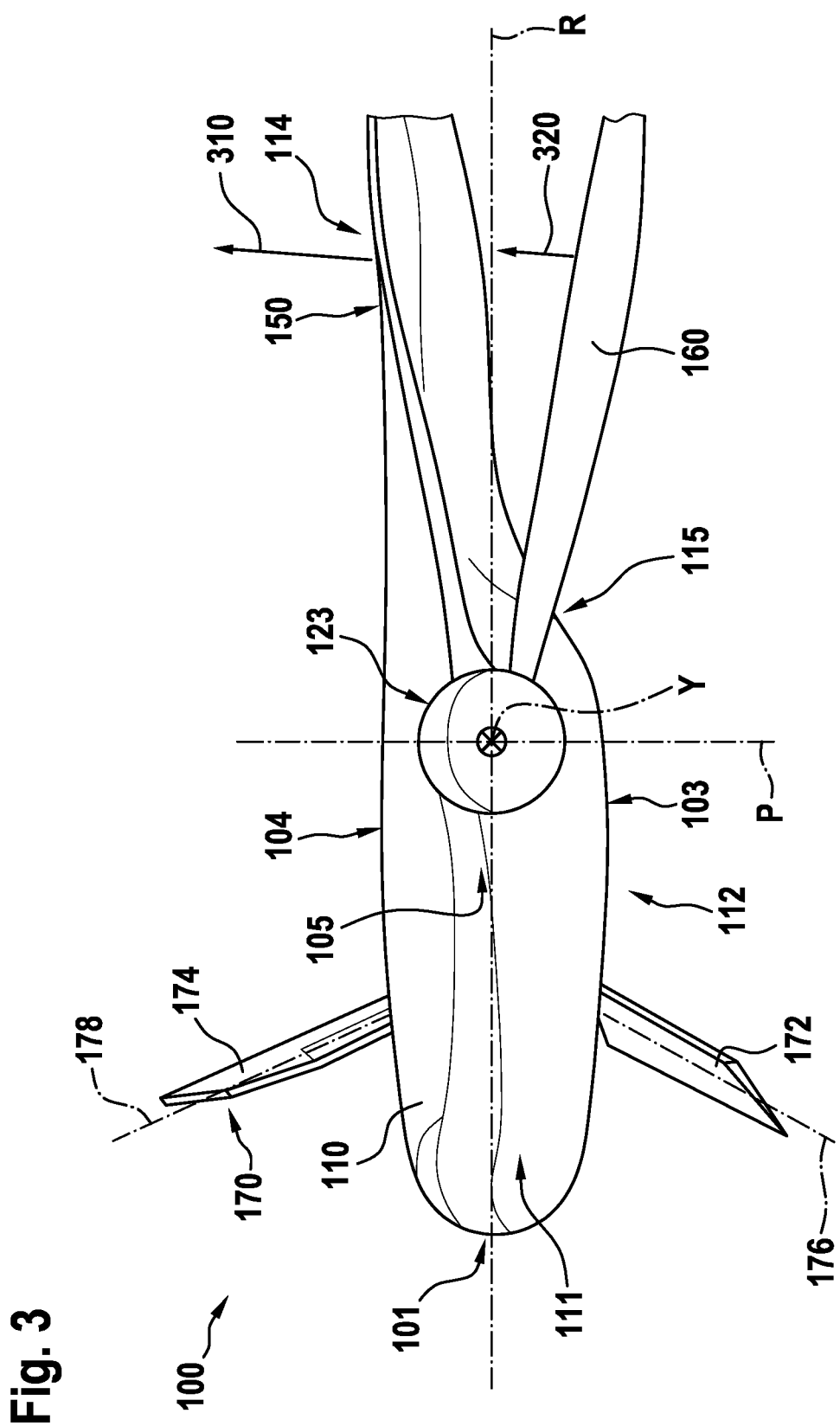
FIG. 3 shows a top view of a part of the rotary wing aircraft of FIG. 1.

FIG. 3 shows the helicopter 100 of FIG. 1, with the nose region 101 and the pitch, roll, and yaw axes P, R, Y. The helicopter 100 has the fuselage 110 that comprises the front section 112, the recess area 115, and the rear section 114, and that forms the port side wall 103 and the starboard side wall 104. However, in contrast to FIG. 1 only the rotor head 123 of the main rotor 120 of FIG. 1 is shown and illustration of the stabilizer arrangement 130 is omitted, for simplicity and clarity of the drawing.

According to FIG. 1, the front section 112 is provided with the at least one lateral wing-type aerodynamic device 170 and the rear section 114 is illustrated with the airfoil-shaped aerodynamic device 150 and the wing-type aerodynamic device 160 of FIG. 1. The airfoil-shaped aerodynamic device 150 is preferably configured to generate sideward thrust 310 for main rotor anti-torque from main rotor downwash in operation, and the wing-type aerodynamic device 160 is preferably configured to generate sideward thrust 320 for main rotor anti-torque from main rotor downwash in operation. Additional sideward thrust may be generated by the at least one lateral wing-type aerodynamic device 170 in operation.

Illustratively, the at least one lateral wing-type aerodynamic device 170 comprises the wing element 172 and another wing element 174. By way of example, the wing element 172 is arranged in the front section 112 of the fuselage 110 in front of the rotor head 123 and on the port side wall 103. The wing element 174 is arranged in the front section 112 of the fuselage 110 in front of the rotor head 123 and on the starboard side wall 104. Preferably, the wing elements 172, 174 are arranged close to the nose region 101 of the fuselage 110.

According to one aspect, at least one of the wing elements 172, 174 is a canard-type wing. By way of example, both wing elements 172, 174 are canard-type wings. Alternatively, or in combination, at least one of the wing elements 172, 174 may be formed as a boxwing.

Preferably, the wing elements 172, 174 are tiltable or pivotable. More specifically, the wing elements 172, 174 illustratively comprise associated wing axes 176, 178 which are in unpivoted state of the wing elements 172, 174 preferably at least essentially perpendicular to the roll axis R. In pivoted state of the wing elements 172, 174 the associated wing axes 176, 178 are preferably angled with respect to an orientation of the wing axes 176, 178 in unpivoted state of the wing elements 172, 174, as described below at FIG. 4.

Figure 4:
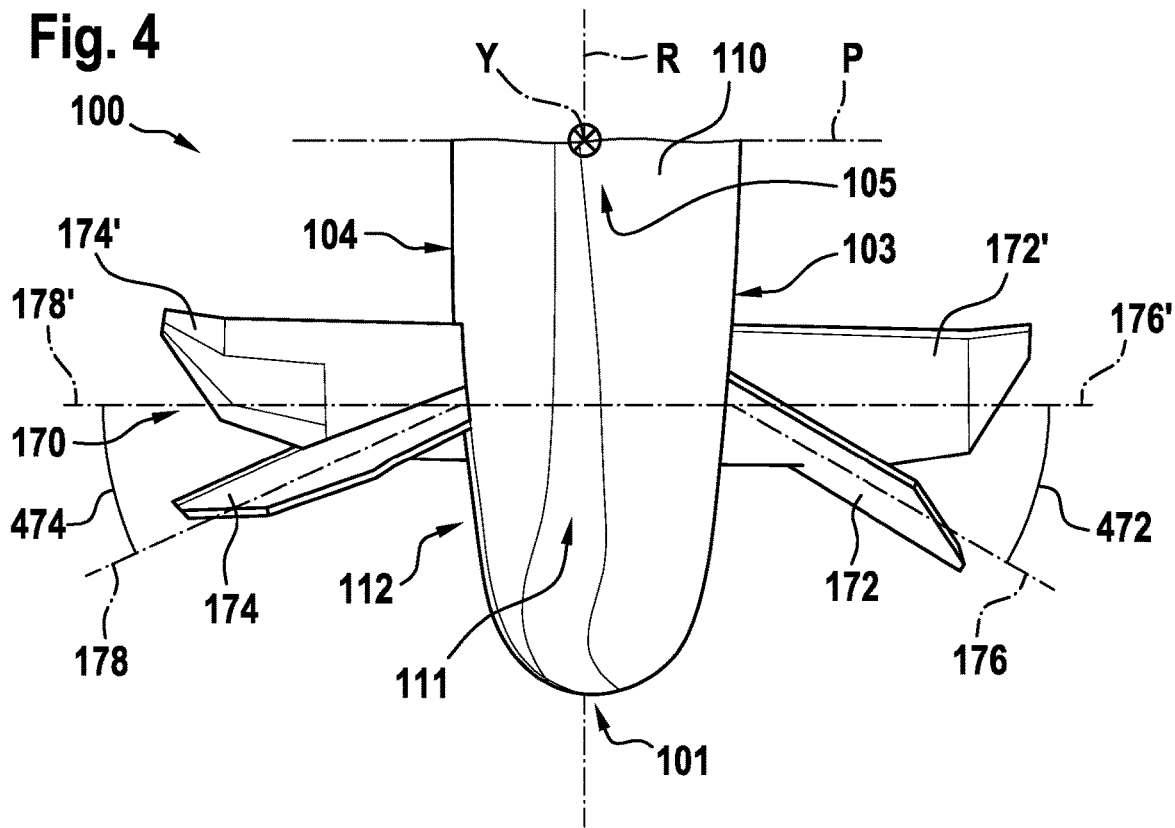
FIG. 4 shows a top view of a nose region of the rotary wing aircraft of FIG. 1.

FIG. 4 shows the nose region 101 of the helicopter 100 of FIG. 3, with the fuselage 110 that comprises the front section 112 and that forms the port side wall 103 and the starboard side wall 104. Furthermore, the pitch, roll, and yaw axes P, R, Y according to FIG. 3 are shown. However, in contrast to FIG. 3 the rear section 114 of the fuselage 110 is not shown at all and the front section 112 is only shown in part, for simplicity and clarity of the drawing.

According to FIG. 3, the front section 112 is provided with the at least one lateral wing-type aerodynamic device 170 that comprises the wing elements 172, 174 with the associated wing axes 176, 178. Similar to FIG. 3, the wing elements 172, 174 are shown in pivoted state.

Furthermore, the wing elements 172, 174 are shown in unpivoted state. Illustratively, the wing elements in the unpivoted state are labelled with the reference signs 172', 174', and their respective wing axes are labelled with the reference signs 176', 178'.

According to one aspect, the wing axes 176', 178' of the wing elements 172', 174' in the unpivoted state are at least essentially in parallel to the pitch axis P. The wing axes 176, 178 of the wing elements 172, 174 in the pivoted state are angled by adjustable angles 472, 474 relative to the wing axes 176', 178' in unpivoted state, i.e., relative to the pitch axis P, and illustratively also around the yaw axis Y.

According to one aspect, the adjustable angles 472, 474 are adjustable such that the wing elements 172, 174 in the pivoted state may be arranged at least essentially vertically, i.e., at least approximately in parallel to the yaw axis Y, in order to enable reduction of drag from main rotor downwash in hover condition. Thus, both wings elements 172, 174 may advantageously also be used as airbrakes in forward flight.

Preferably, each one of the wing elements 172, 174, i.e., 172', 174', is pivotable as a whole such that a required inclination of the wing axes 176, 178 relative to the wing axes 176', 178' may be adjusted as required. Furthermore, each one of the wing elements 172, 174, i.e., 172', 174', is preferably rotatable around its associated wing axis 176, 178, i.e., 176', 178'.

Figure 5:
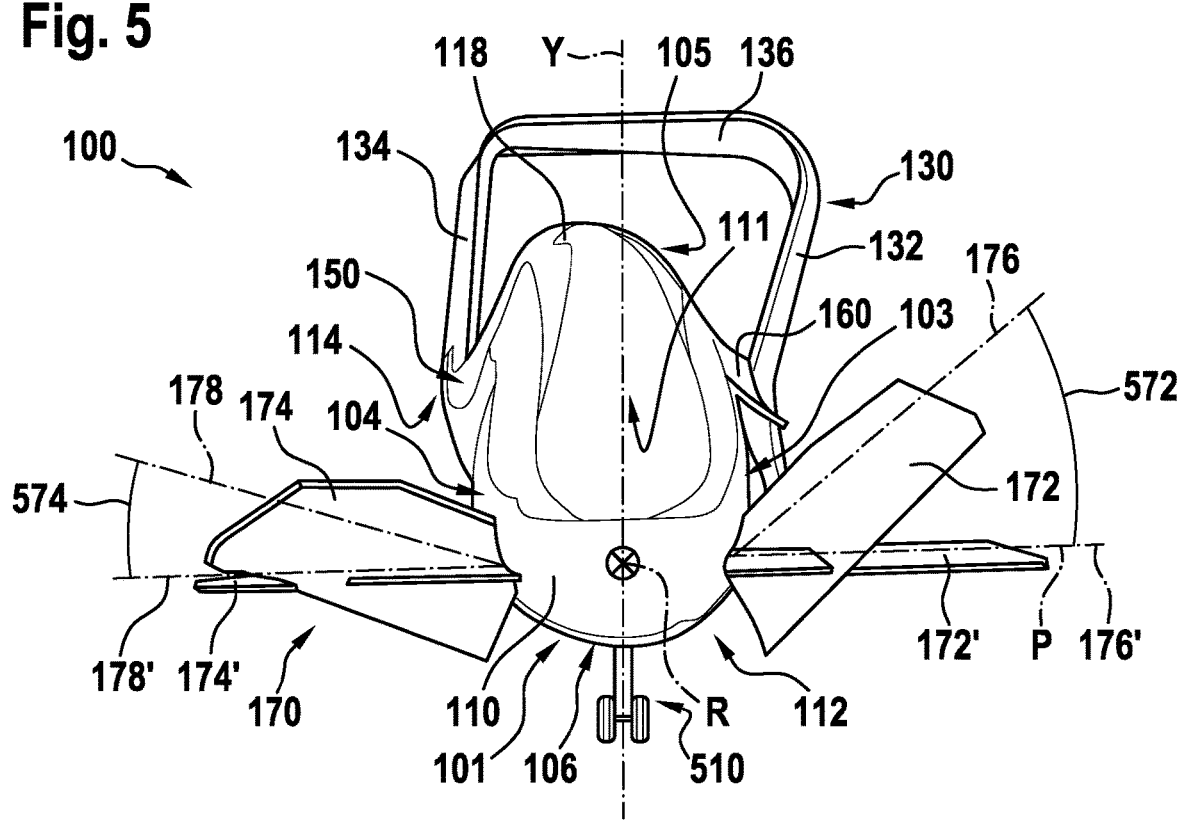
FIG. 5 shows a front view of the rotary wing aircraft of FIG. 1.

FIG. 5 shows the helicopter 100 of FIG. 1, with the nose region 101 and the pitch, roll, and yaw axes P, R, Y. The helicopter 100 has the upper deck 105 that is covered by the cowling 118, and the fuselage 110 that comprises the front section 112 and the rear section 114, and that forms the port side wall 103 and the starboard side wall 104. The rear section 114 comprises the airfoil-shaped aerodynamic device 150 and the wing-type aerodynamic device 160, both of which are connected to the stabilizer arrangement 130. Illustratively, the stabilizer arrangement 130 is slightly inclined toward the port side wall 103, i.e., toward the left-hand side of the helicopter 100. However, in contrast to FIG. 1 the helicopter 100 is now shown with a retractable landing gear 510, which is illustratively of the wheel-type, and illustration of the main rotor 120 of FIG. 1 is omitted, for simplicity and clarity of the drawing.

According to FIG. 4, the front section 112 is provided with the at least one lateral wing-type aerodynamic device 170 that comprises the wing elements 172, 174. The wing elements 172, 174 are shown in pivoted state with the wing axes 176, 178, as well as in unpivoted state. In the unpivoted state, the wing elements are labelled with the reference signs 172', 174' and their wing axes are labelled with the reference signs 176', 178'. Illustratively, the wing axes 176, 178 of the wing elements 172, 174 in the pivoted state are angled by adjustable angles 572, 574 relative to the wing axes 176', 178' in unpivoted state, i.e., relative to the pitch axis P and illustratively around the roll axis R. The adjustable angles 572, 574 may range from 0° to 50°.

At this point, it should be noted that in contrast to FIG. 5 it is explained above at FIG. 4 that the wing axes 176, 178 are angled by adjustable angles 472, 474 relative to the wing axes 176', 178', i.e., relative to the pitch axis P and around the yaw axis Y. As may be derived from FIG. 4 and FIG. 5 together, the respective angles may be decomposed in a first component around the yaw axis Y and a second component around the roll axis R, or they may be obtained by rotation around a rotation axis perpendicular to the roll axis R with an inclination between the pitch axis P and the yaw axis Y.

It should further be noted that the adjustable angles 572, 574 illustratively differ from each other. This preferably results from an individual control of the adjustable angles 572, 574 at least in hover condition of the helicopter 100 on the basis of a respectively required sideward thrust for main rotor anti-torque that is to be generated from main rotor downwash.

More specifically, actuation of the wing elements 172, 174 for adjustment of the adjustable angles 572, 574 is preferably coupled to actuation of the retractable landing gear 510, which is illustratively arranged in the front section 112. In other words, the retractable landing gear 510 is preferably operatively coupled to the wing elements 172, 174 such that actuation of the retractable landing gear 510 leads to actuation of the wing elements 172, 174 for adjustment of the adjustable angles 572, 574.

According to one aspect, the front section 112 may further comprise at least one source of asymmetry that is illustratively formed by an asymmetric shaping of the upper deck 105. More specifically, the upper deck 105 may comprise an asymmetrically shaped upper starboard side wall extension. By way of example, the asymmetrically shaped upper starboard side wall extension is formed by an asymmetric shaping of the cowling 118 and, more particularly, by an asymmetric arrangement of the cowling 118 on the upper deck 105.

Figure 6:
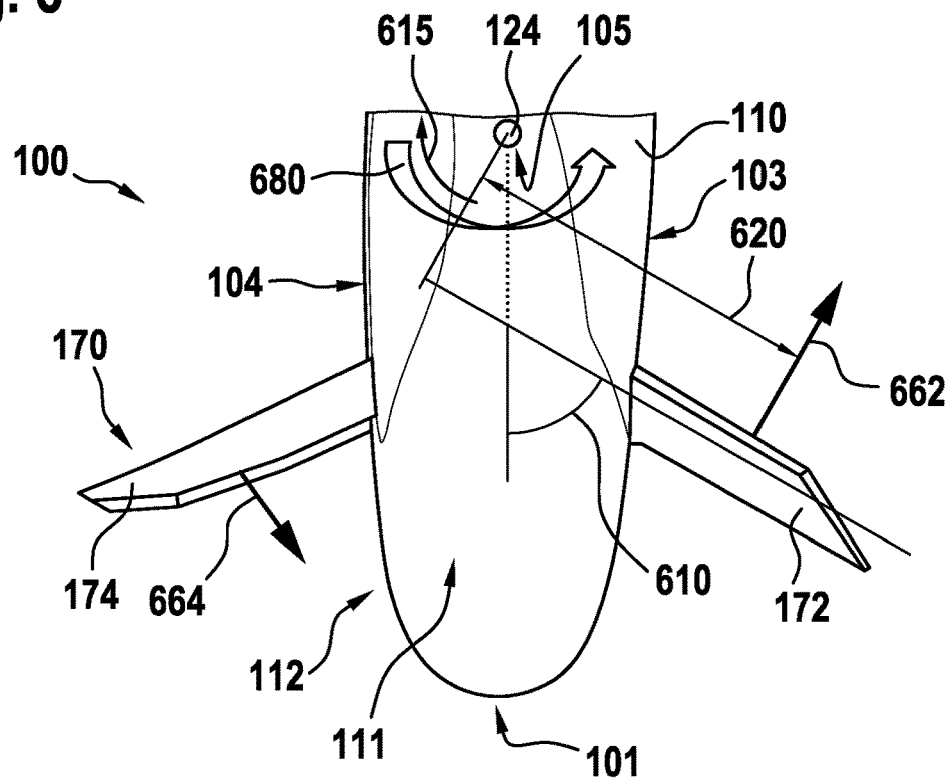
FIG. 6 shows the nose region of the rotary wing aircraft of FIG. 4 in operation.

FIG. 6 shows the nose region 101 of the helicopter 100 of FIG. 3, with the fuselage 110 that comprises the front section 112 and that forms the port side wall 103 and the starboard side wall 104. Furthermore, the rotor mast 124 of the main rotor 120 according to FIG. 1 is shown. However, in contrast to FIG. 3 the rear section 114 of the fuselage 110 is not shown at all and the front section 112 is only shown in part, for simplicity and clarity of the drawing.

According to FIG. 3, the front section 112 is provided with the at least one lateral wing-type aerodynamic device 170 that comprises the wing elements 172, 174 with the associated wing axes 176, 178. Similar to FIG. 3, the wing elements 172, 174 are shown in pivoted state. More specifically, the wing element 172 is illustratively shown with a pivoted swept forward angle 610.

In operation, the main rotor 120 of FIG. 100 rotates through rotation of the rotor mast 124 and produces main rotor torque and main rotor downwash. Assuming that the rotor mast 124 rotates in counterclockwise direction, the main rotor torque 615 is oriented in clockwise direction.

The main rotor downwash streams along the wing elements 172, 174 in pivoted state such that anti-torque forces, i.e., sideward thrust 662, 664 is generated. Illustratively, the anti-torque force 662 acts with a lever 620 on the rotor mast 124 and the anti-torque force 664 acts with a similar lever on the rotor mast 124. Thus, a resulting main rotor anti-torque 680 around the rotor mast 124 is generated.

Figure 7:
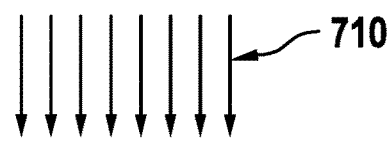
FIG. 7 shows a functional diagram of lateral wing elements provided at the nose region of the rotary wing aircraft of FIG. 6 in hover condition.
Figure 7:
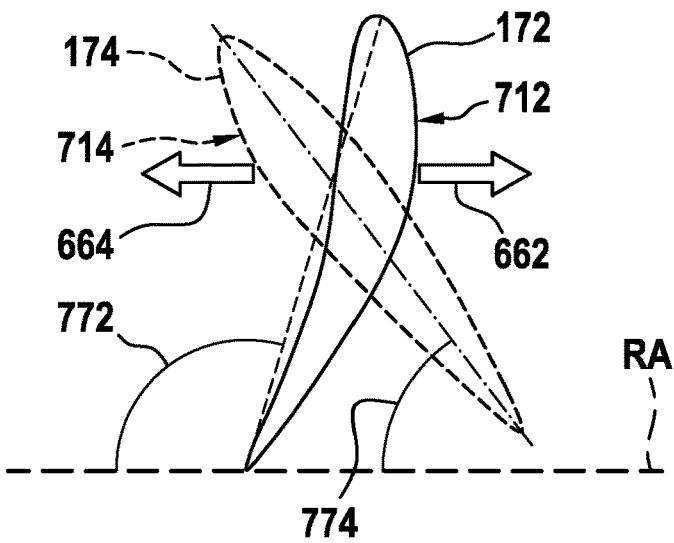

FIG. 7 shows the wing elements 172, 174 of FIG. 6 in pivoted state. More specifically, generation of the anti-torque forces, i.e., the sideward thrust 662, 664 by the wing elements 172, 174 from main rotor downwash 710 is illustrated.

As explained above at FIG. 5, an individual adjustment of the wing elements 172, 174 to mutually different pivoting angles is preferably enabled. In other words, the wing elements 172, 174 are preferably individually pivotable to different pivoting angles. For purposes of illustration, two different pivoting angles 772, 774 with respect to a reference axis RA are shown.

Furthermore, according to one aspect, the wing element 172 comprises an airfoil profile 712 and the wing element 174 comprises an airfoil profile 714. Preferably, the airfoil profile 712 differs from the airfoil profile 714.

More generally, both wing elements 172, 174 may have different airfoil profiles, wing span, depth and surface area. In fact, e.g., for a counterclockwise rotating main rotor 120 of FIG. 1, the wing element 172 must develop more lift in fast forward flight because the airflow on a rearward rotating main rotor blade has a lower airflow speed than the airflow at a forward rotating main rotor blade. Therefore, above a certain forward speed it is difficult or impossible to increase the angle of attack of the rearward rotating main rotor blade to compensate the reduced airspeed. Accordingly, in order to compensate this effect more lift must be produced with the wing element 172. This can be achieved by airfoils with higher possible maximum lift, higher angles of attack, more wing span, higher depth, surface area or cascading profiles.

Figure 8:
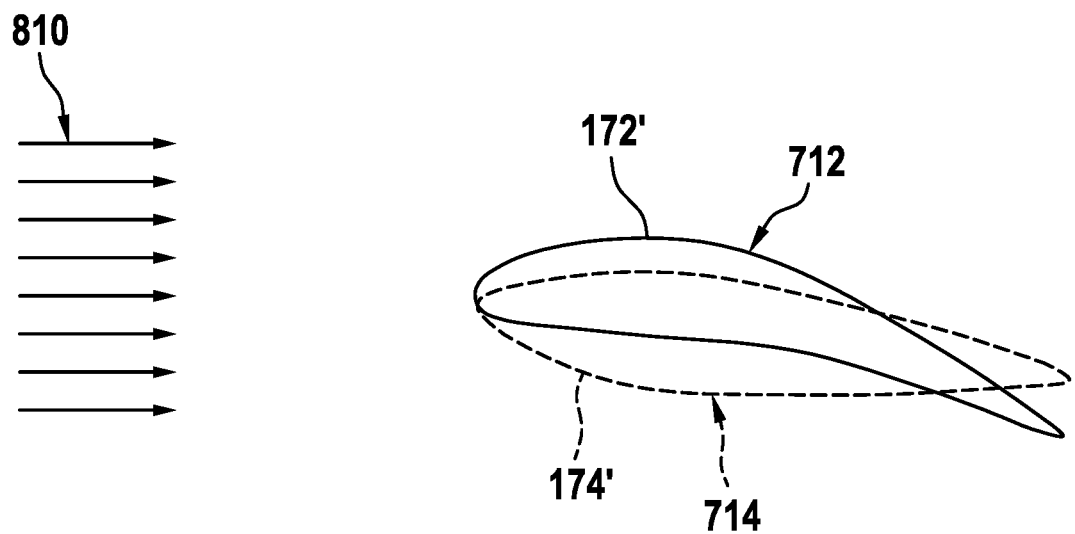
FIG. 8 shows a functional diagram of lateral wing elements provided at the nose region of the rotary wing aircraft of FIG. 6 in forward flight.

FIG. 8 shows the wing elements 172', 174' of Figure and FIG. 5 in unpivoted state, in which the wing elements 172', 174' are illustratively subjected to an airflow 810 in forward flight. By way of example, the wing elements 172', 174' comprise the airfoil profiles 712, 714 of FIG. 7.

At this point, it should be noted that modifications to the above-described realizations are within the common knowledge of the person skilled in the art and, thus, also considered as being part of the present disclosure. For instance, the helicopter 100 described above may be equipped with a tail propeller that is essentially provided to generate forward thrust in forward flight. This tail propeller may e.g., be mounted to the stabilizer arrangement 130 described above.

Furthermore, in the stabilizer arrangement 130 described above at least one of the vertical stabilizers may have a rudder or a rotatable profile section to control generated sideward thrust in forward flight. A respective control action may be linked to pedal deflection and, thus, to pilot input, similar to airplanes.

Furthermore, the airfoil-shaped aerodynamic device 150 described above may be realized with one, two or more separate airfoil-shaped aerodynamic devices.

Moreover, the wing-type aerodynamic device 160 described above may have a width that increases from the upper deck over a predetermined length of the wing-type aerodynamic device 160. More specifically, the width may start to increase at the upper deck and then increase in direction of the aft region of the compound helicopter. By way of example, the width may increase such that a maximum width value is reached at an area located between 60% of the length of the rotor blades and their outer ends. For instance, the width may increase over at least 75% of the length of the wing-type aerodynamic device 160.

Further illustrative modifications, which may be applied to any one of the above-described embodiments, are described below with reference to FIG. 9 to FIG. 11.

Figure 9:
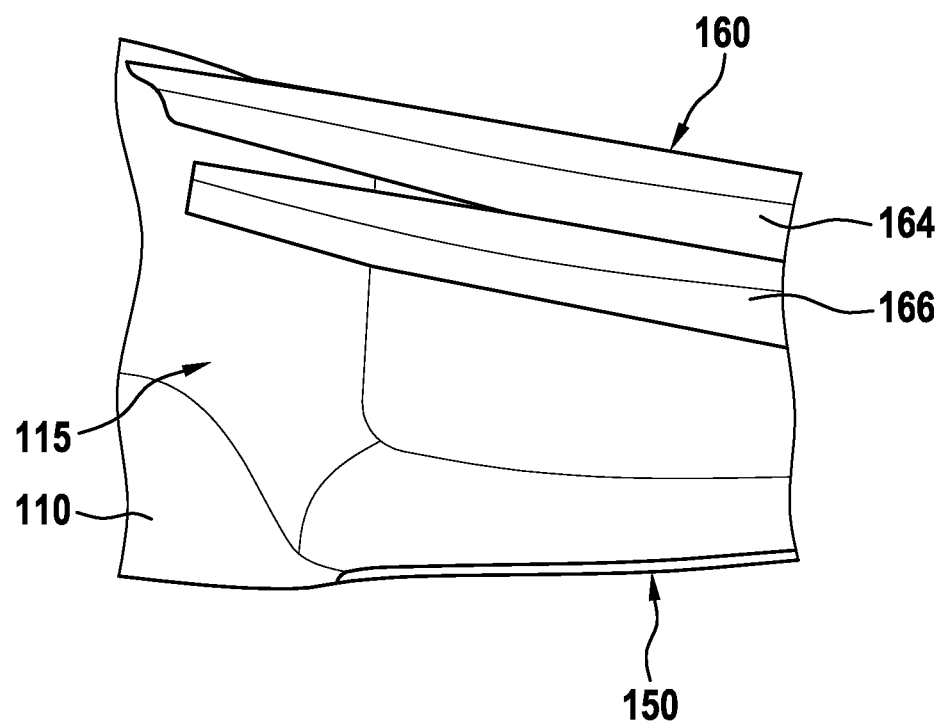
FIG. 9 shows a cut-out of the rotary wing aircraft of FIG. 1 to FIG. 6 with an additional wing-type aerodynamic device.

FIG. 9 shows a portion of the helicopter 100 of FIG. 1 with the fuselage 110, the recess area 115, the airfoil-shaped aerodynamic device 150, and the wing-type aerodynamic device 160. By way of example, the wing-type aerodynamic device 160 is now formed by two separate wing-type aerodynamic devices 164, 166.

Figure 10:
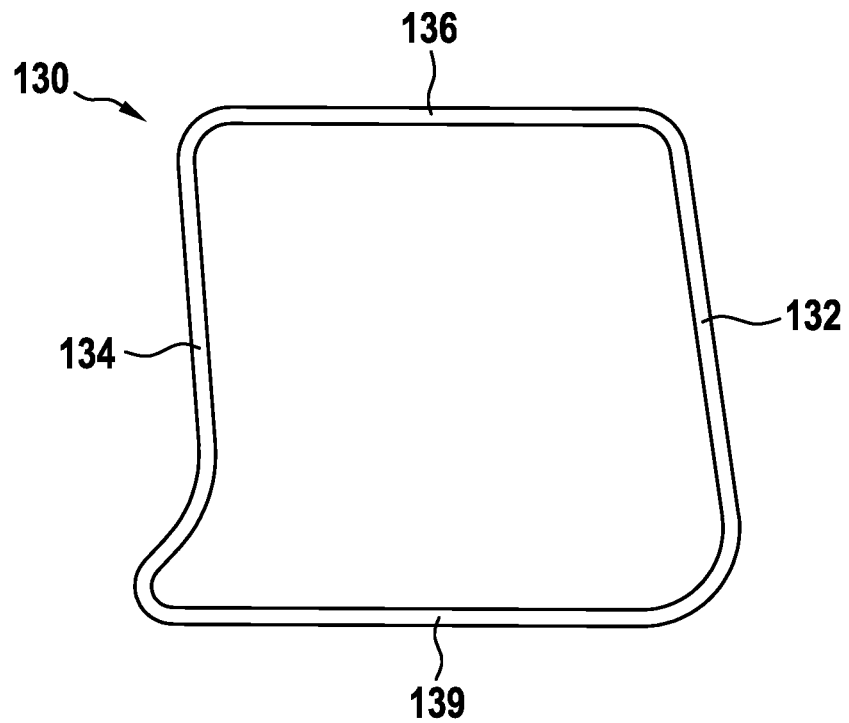
FIG. 10 shows a schematic view of a stabilizer arrangement according to one aspect.

FIG. 10 shows the stabilizer arrangement 130 of FIG. 1 with the vertical stabilizers 132, 134, and the horizontal stabilizer 136 which connects the vertical stabilizer 132 to the vertical stabilizer 134. However, by way of example the horizontal strut 138 of FIG. 1 is now omitted and, instead, a boxwing-type connection 139 is provided that connects the vertical stabilizer 132 to the vertical stabilizer 134 such that the stabilizer arrangement 130 forms a boxwing-type configuration, i.e., a closed loop.

Figure 11:
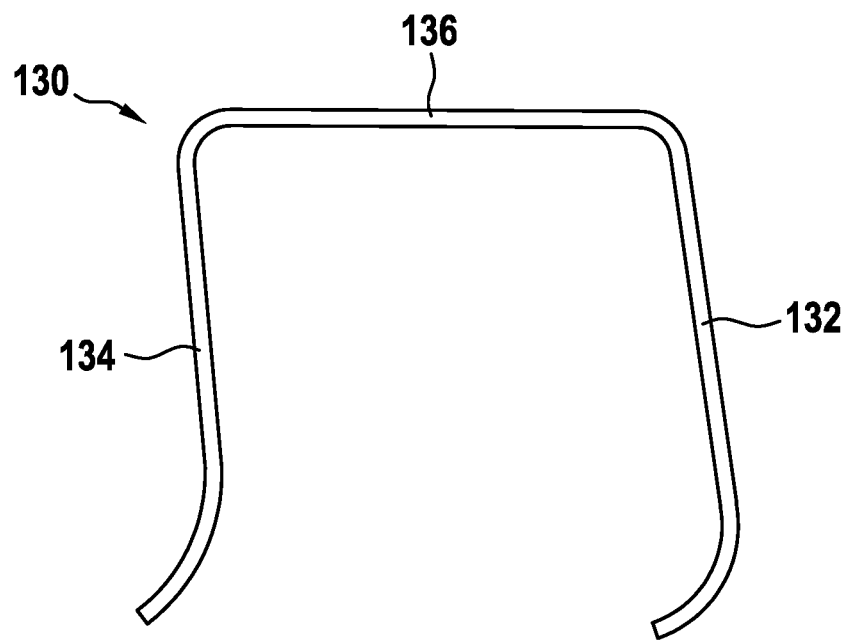
FIG. 11 shows a schematic view of a stabilizer arrangement according to another aspect.

FIG. 11 shows the stabilizer arrangement 130 of FIG. 1 with the vertical stabilizers 132, 134, and the horizontal stabilizer 136 which connects the vertical stabilizer 132 to the vertical stabilizer 134. However, by way of example the horizontal strut 138 of FIG. 1 is now omitted.

REFERENCE LIST 100 rotary wing aircraft
101 aircraft nose region
102 aircraft aft region
103 portside wall
104 starboard side wall
105 aircraft upper deck
106 fuselage lower side
110 fuselage
111 cabin
112 fuselage front section
114 fuselage rear section
115 recess area
116 fuselage upper limit
118 cowling
120 main rotor
122 rotor plane
123 rotor head
124 rotor mast
125, 126, 127, 128, 129 rotor blades
130 stabilizer arrangement
132, 134 vertical stabilizers
135, 137 vertical stabilizer tips
136 horizontal stabilizer
138 horizontal strut
139 boxwing-type connection
140 aircraft rear door
150 airfoil-shaped aerodynamic device
155 smooth transition
160 wing-type aerodynamic device
164, 166 separate wing-type aerodynamic devices
170 canard wings
172, 174 separate canard wings in pivoted state
172', 174' separate canard wings in unpivoted state
176, 178 canard wing axes in pivoted state
176', 178' canard wing axes in unpivoted state
180 symmetrical cross-sectional profile of front section
190 asymmetrical cross-sectional profile of rear section
191, 193, 195 asymmetrical cross-sectional profiles
210 bottom line
220 bottom line inclination angle
230 horizontal reference plane
310, 320 sideward thrust
472, 474 canard wing pivoting angles relative to P-axis and around Y-axis
510 retractable landing gear
572, 574 canard wing pivoting angles relative to P-axis and around R-axis
610 swept angle pivoted
615 main rotor torque
620 lever
662, 664 generated anti-torque forces
680 resulting anti-torque moment
710 main rotor downwash
712, 714 airfoil profiles
772, 774 canard wing pivoting angles relative to and around P-axis
810 airflow in forward flight
P aircraft pitch axis
R aircraft roll axis
Y aircraft yaw axis
RA reference axis

What is claimed is:

1. A rotary wing aircraft that extends along an associated roll axis between a nose region and an aft region and that comprises a fuselage with a front section and a rear section, wherein the front section of the fuselage forms a cabin for passengers and/or cargo, the rotary wing aircraft comprising:
   a main rotor that is rotatably mounted at the front section to rotate around a main rotor axis,
   a stabilizer arrangement that is arranged at the rear section in the aft region,
   at least one lateral aerodynamic wing that is arranged at the front section and is entirely in front of the main rotor axis, and
   a retractable landing gear,
   wherein the rear section extends between the front section and the stabilizer arrangement and is devoid of a tail rotor and comprises an asymmetrical cross-sectional profile in direction of the associated roll axis and varying non-linearly along the rear section between the front section and the stabilizer arrangement to form with the stabilizer arrangement a passive anti-torque device that provides anti-torque to counteract torque created by the main rotor,
   wherein the at least one lateral aerodynamic wing comprises at least one wing element that is pivotable relative to the fuselage to generate sideward thrust for main rotor anti-torque from main rotor downwash, and
   wherein the retractable landing gear is operatively coupled to the at least one wing element such that actuation of the retractable landing gear leads to actuation of the at least one wing element.

2. The rotary wing aircraft of claim 1, wherein the retractable landing gear is connected to the at least one wing element, and wherein the at least one wing element comprises at least a first wing element and a second wing element, and wherein the first and second wing elements are individually pivotable to different pivoting angles.

3. The rotary wing aircraft of claim 2, wherein the first wing element comprises a first airfoil profile and the second wing element comprises a second airfoil profile, and wherein the first airfoil profile differs from the second airfoil profile.

4. The rotary wing aircraft of claim 1, wherein the at least one wing element is a canard wing.

5. The rotary wing aircraft of claim 1, wherein the stabilizer arrangement comprises at least one horizontal stabilizer and at least one first and one second vertical stabilizer, and wherein the at least one horizontal stabilizer connects the first vertical stabilizer to the second vertical stabilizer.

6. The rotary wing aircraft of claim 5, wherein the stabilizer arrangement comprises a boxwing connection that connects the first vertical stabilizer to the second vertical stabilizer such that the stabilizer arrangement forms a boxwing configuration.

7. The rotary wing aircraft of claim 1, wherein the rear section comprises at least one airfoil-shaped aerodynamic device that extends from the front section to the stabilizer arrangement, and wherein the at least one airfoil-shaped aerodynamic device is configured to generate sideward thrust for main rotor anti-torque from main rotor downwash.

8. The rotary wing aircraft of claim 1, further comprising at least one longitudinal aerodynamic wing that extends between the front section and the stabilizer arrangement, wherein the at least one longitudinal aerodynamic wing is configured to generate sideward thrust for main rotor anti-torque from main rotor downwash.

9. The rotary wing aircraft of claim 6, further comprising at least one longitudinal aerodynamic wing that extends between the front section and the stabilizer arrangement, wherein the at least one longitudinal aerodynamic wing is configured to generate sideward thrust for main rotor anti-torque from main rotor downwash, and wherein the at least one longitudinal aerodynamic wing is attached to the at least one second vertical stabilizer.

10. The rotary wing aircraft of claim 1, which is embodied as a compound helicopter, wherein the main rotor forms a single rotor plane.

11. A rotary wing aircraft that extends along an associated roll axis between a nose region and an aft region and that comprises a fuselage with a front section and a rear section, wherein the front section of the fuselage forms a cabin for passengers and/or cargo, the rotary wing aircraft comprising:
   a main rotor that is rotatably mounted at the front section to rotate around a main rotor axis,
   a stabilizer arrangement that is arranged at the rear section in the aft region, and
   a longitudinal aerodynamic wing that extends between the front section and the stabilizer arrangement,
   wherein the rear section extends between the front section and the stabilizer arrangement and is devoid of a tail rotor and comprises an asymmetrical cross-sectional profile in direction of the associated roll axis and varying non-linearly along the rear section between the front section and the stabilizer arrangement to form with the stabilizer arrangement a passive anti-torque device that provides anti-torque to counteract torque created by the main rotor, wherein the stabilizer arrangement comprises a horizontal stabilizer and a first vertical stabilizer and a second vertical stabilizer, and wherein the horizontal stabilizer connects the first vertical stabilizer to the second vertical stabilizer,
   wherein the stabilizer arrangement comprises a boxwing connection that connects the first vertical stabilizer to the second vertical stabilizer such that the stabilizer arrangement forms a boxwing configuration, and
   wherein the longitudinal aerodynamic wing is configured to generate sideward thrust for main rotor anti-torque from main rotor downwash, and wherein the rear section is attached to the first vertical stabilizer and the longitudinal aerodynamic wing is attached to the second vertical stabilizer.

12. The rotary wing aircraft of claim 11, further comprising at least one lateral aerodynamic wing that is arranged at the front section and is entirely in front of the main rotor axis.

13. The rotary wing aircraft of claim 12, wherein the at least one lateral aerodynamic wing comprises at least one wing element that is pivotable relative to the fuselage to generate sideward thrust for main rotor anti-torque from main rotor downwash.

14. A rotary wing aircraft extending along an associated roll axis between a nose region and an aft region and comprising a fuselage with a front section and a rear section, wherein the front section of the fuselage forms a cabin for passengers and/or cargo, the rotary wing aircraft comprising:
   a main rotor rotatably mounted at the front section to rotate around a main rotor axis, a stabilizer arrangement at the rear section in the aft region, a lateral aerodynamic wing at the front section and entirely in front of the main rotor axis, and a retractable landing gear, the rear section extending between the front section and the stabilizer arrangement and being devoid of a tail rotor and comprising an asymmetrical cross-sectional profile in the direction of the associated roll axis and varying non-linearly along the rear section between the front section and the stabilizer arrangement to form with the stabilizer arrangement a passive anti-torque device that provides anti-torque to counteract torque created by the main rotor, the lateral aerodynamic wing comprising a wing element pivotable relative to the fuselage, and the retractable landing gear being operatively coupled to the wing element such that actuation of the retractable landing gear actuates the wing element.

15. The rotary wing aircraft of claim 14, wherein the rear section in extending between the front section and the stabilizer arrangement is asymmetrically located to a side of the fuselage.

16. The rotary wing aircraft of claim 14 wherein:

the rear section further comprises an airfoil-shaped aerodynamic device that extends between the front section and the stabilizer arrangement and is configured to generate sideward thrust for main rotor anti-torque from main rotor downwash.

17. The rotary wing aircraft of claim 16 wherein:

the rear section further comprises a longitudinal aerodynamic wing that extends between the front section and the stabilizer arrangement and is configured to generate sideward thrust for main rotor anti-torque from main rotor downwash.

18. The rotary wing aircraft of claim 17 wherein:

the stabilizer arrangement comprises a horizontal stabilizer and first and second vertical stabilizers, and the horizontal stabilizer connects the first and second vertical stabilizers;

the airfoil-shaped aerodynamic device is attached to the first vertical stabilizer; and the longitudinal aerodynamic wing is attached to the second vertical stabilizer.

19. The rotary wing aircraft of claim 17 wherein:

the airfoil-shaped aerodynamic device in extending between the front section and the stabilizer arrangement is located to a side of the fuselage that is farther away from an approaching rotor blade of the main rotor; and the longitudinal aerodynamic wing in extending between the front section and the stabilizer arrangement is located to an opposite side of the fuselage.

20. The rotary wing aircraft of claim 14 wherein:

the front section includes a first side on one side of the roll axis and a second side on an opposite side of the roll axis;

the stabilizer arrangement includes first and second vertical stabilizers connected by a horizontal stabilizer, the first vertical stabilizer is on the one side of the roll axis and the second vertical stabilizer is on the opposite side of the roll axis; and the rear section in extending between the front section and the stabilizer arrangement extends from the first and second sides of the front section to the first vertical stabilizer; and the rotary wing aircraft further including a longitudinal aerodynamic wing that extends on the opposite side of the roll axis between the front section and the second vertical stabilizer.

* * * * *